United States Patent [19]

Kaplan

[11] Patent Number: 5,408,571

[45] Date of Patent: Apr. 18, 1995

[54] AERIAL STORAGE UNIT FOR FIBER OPTIC CABLE

[75] Inventor: Steve E. Kaplan, Elyria, Ohio

[73] Assignee: Multilink, Inc., Elyria, Ohio

[21] Appl. No.: 165,677

[22] Filed: Dec. 13, 1993

[51] Int. Cl.$^6$ .............................................. G02B 6/36
[52] U.S. Cl. ................................................... 385/135
[58] Field of Search ............................ 385/135–137, 385/147

[56] References Cited

U.S. PATENT DOCUMENTS

| | | | |
|---|---|---|---|
| 4,518,817 | 5/1985 | Kirby et al. | 385/135 X |
| 4,753,499 | 6/1988 | Malkani et al. | 385/135 |
| 4,765,709 | 8/1988 | Suillerot et al. | 385/135 |
| 5,092,663 | 3/1992 | Hivner | 385/135 X |
| 5,119,459 | 6/1992 | Meyerhoefer et al. | 385/135 |

Primary Examiner—Akm E. Ullah

[57] ABSTRACT

An aerial storage device for storing an extra length of fiber optic cable as a loop in a transmission line in which the storage device has an arcuate end providing the return or turn-around arc of the loop and a planar deck, the outer periphery thereof defining the loop for the cable and being joined with the top of an inner sidewall of a U-shaped channel for receiving and storing a planar loop of fiber optic cable with the sidewalls of the channel being perpendicular to the plane of the deck and extending to one side thereof. The device is a one piece molded plastic device of plastic and has openings in the channel bottom and deck for tying cable to the device and reducing wind sway. The channel bottom and inner side wall extend around end of the device where the cable portions enter and exit the loop to provide a shelf for supporting the cable portions and a smooth nose surface for providing a smooth separation therebetween. The deck has a plurality of bolt holes for selective use in suspending the device or in stacking units.

22 Claims, 2 Drawing Sheets

AERIAL STORAGE UNIT FOR FIBER OPTIC CABLE

The present invention relates to storage devices for storing an extra length of fiber optic cable in a transmission line for data signals, and particularly to an aerial storage device for use in a fiber optic cable television transmission line.

As is well known, for the purpose of maintenance and service, there are advantages to storing an extra length of cable in a fiber optic transmission line, particularly one used for cable television. The extra length of cable is commonly stored by looping it around the outer periphery of, and tying it to, an aerial device or bracket which is hung from a support strand for the fiber optic transmission line, or, alternatively, mounted on a transmission line pole. The stored length of transmission line has entering and exiting portions at one end of the bracket which are in proximate positions. At the end of the aerial device opposite to the entering and exiting end, the bracket has a relatively wide arcuate periphery to provide a return or turn-around loop or arc portion for the cable, with the sides of the device from the ends of the turn-around arc portion converging toward the proximate positions of the cable at the entering and exiting end of the device.

In a known device, a generally U-shaped channel, constituting the outer periphery of the aerial device, forms a guide for the cable along the sides and the return arc portion of the device, the sides of the channel being oriented generally parallel to the plane of the cable loop, i.e., generally horizontal in a suspended aerial device, with the open end of the channel facing outwardly from the side of device. In this arrangement, the cable does not become trapped in the channel as a workman bends a strand of cable around the outside periphery of the device to put it into storage. Nor does the workman receive help from the channel sidewalls in holding the loop tight against the side of the bracket to handle internal forces tending to straighten the cable the channel or other forces which may occur while looping the cable which tend to move the cable outwardly away from the side of the device.

Further, known aerial storage devices of the type described are made of metal and their design and metal structure has made it expensive to fabricate and heavy to handle and ship as well as making it difficult to avoid potentially cable damaging edges or corners, particularly corners and edges adjacent the portions of fiber optic cable where the cable enters and exits the storage device.

Because the storage devices are commonly hung from support strands along the transmission lines, they are subject to considerable wind sway. Edges and corners on parts of the storage device adjacent the cable can be a substantial hazard to cable integrity both during wind sway and when putting the cable into or taking it from storage.

In known aerial fiber optic cable storage devices, it is difficult to provide openings in their structure which are easily accessible and sufficient in number to provide flexibility in tying the cable to the aerial device as it is being formed into a loop to put it into storage.

It is an object of the present invention to provide a new and improved aerial device for storing extra cable length as a loop in a fiber optic transmission line in which channel means for receiving the cable and storing it as loop is such that the channel will aid the workman form and confine the loop of extra cable in the storage channel.

Another object is to provide such an aerial storage device free of edges and other surfaces which may damage the cable.

A further an object is to provide such an aerial storage device which is relatively light weight and inexpensive and easily manufactured.

A more specific object of the present invention is to provide an aerial storage device of the type described, which can be readily molded or formed, and which preferably minimizes or eliminates electrical hazards to workmen when handling the storage near electrical transmission lines and other electrical problems such as lightning as well as minimizing wind sway.

Yet another object of the present invention is to provide easily accessible openings which are distributed along a channel for storing the cable which are easily accessed to tie the cable to the device and which also function to minimize wind sway.

A further object of the present invention is to provide storage device of the type described which is easily stacked to form a multi-unit storage device for storing fiber optic cable or the like, or to facilitate shipping and handling.

SUMMARY OF THE INVENTION

In accordance with the preferred embodiment of the present invention, the aerial storage device of the type described for storing a loop of cable is a molded or formed as integral one piece, preferably plastic, storage device with the structure having a deck, or mounting and supporting structure, which is essentially flat so as to lie along a plane. The deck has outer peripheral portions which define the loop for the cable for the cable to be stored and which are integrally joined with channel means for receiving the cable and storing it in a generally planar loop. The channel means is a U-shaped, open top channel means having side walls and a bottom for receiving and storing the cable therebetween around the outer periphery of the deck. The bottom of the channel means is parallel to the plane of the deck and the side walls of the channel means constitute spaced inner and outer side walls extending generally perpendicularly to the plane of the loop and deck with the inner side wall being integrally joined with the deck (by molding in the preferred embodiment) at the outer peripheral portions of the deck.

The channel means has an arcuate portion at one end of the deck providing a return loop portion, or turn-around arc portion, for the cable. Opposite sides of the storage device are formed by the outer wall of the channel means and converge from the ends of the return loop portion toward the other end of the device so that the cable portions are in proximate positions at the other end of the device, the return arc portion and the angle and length of the converging sides being such as to provide a smooth tangential transition from the opposite ends of the arc portion into the channel means on the opposite sides of the loop.

To minimize edges and corners, especially those bearing against the entering and exiting cable portions, the bottom of the channel means preferably extends around the narrow end of the device end with the outer channel wall terminating inwardly of the narrow end to provide an open shelf which extends around that end to support the cable portions entering and exiting the device. The inner side wall of the channel means also extends around the device and is preferably rounded at the narrow end to provide a smooth nose separating the entering and leaving cable portions at that end.

In the preferred embodiment, the U-shaped channel means is a channel with inner and outer walls which have continuity throughout the extent of the loop but with the outer sidewall of the channel means terminating short of the entering and exit end of the device as heretofore described.

The deck structure has openings therethrough which provide a skeletal deck to minimize wind sway while providing structural integrity for the aerial device.

The bottom of the channel means has openings distributed along the bottom thereof to facilitate the tying of the cable to the device and to minimize wind sway because of the reorientation of the channel.

DESCRIPTION OF THE DRAWINGS

In the drawings which illustrate a preferred embodiment of an aerial storage device embodying the invention.

DESCRIPTION OF PREFERRED EMBODIMENTS

Figure 1:
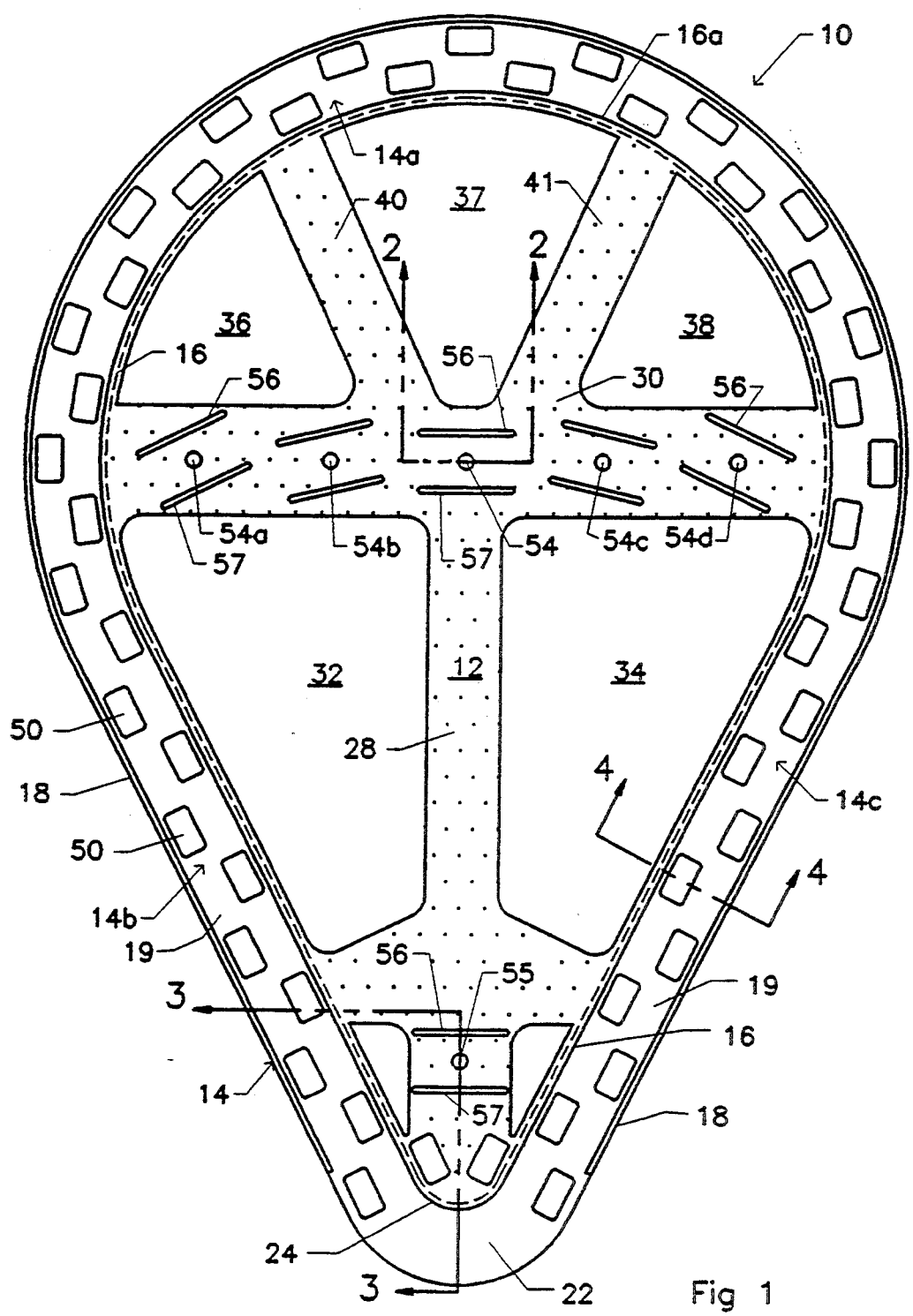
FIG. 1 is a top plan view of the aerial storage device.

The preferred form of the aerial storage device for storing an extra length of cable as a loop along the transmission line is illustrated in the drawings and is generally designated by the reference character 10. The device 10 has a relatively narrow end at which the stored cable enters and leaves the loop of the device and a relatively wide end which is arcuate to provide a return arc portion or loop for the cable. The sides of the device converge from the ends of the arc portion toward the narrow end so that the stored cable enters and exits the device with entering and exiting portions alongside of each other.

The device 10 is, preferably, a plastic, integrally molded, one piece device, which is viewed in top plan in FIG. 1, and comprises a generally flat, skeletal planar deck 12 whose outer periphery defines the loop to be followed by the cable. U-shaped channel means 14 for receiving and storing the cable depends from the outermost peripheral portions of the deck. The channel means 14 comprises inner and outer sidewalls 16 and 18, respectively, and a bottom 19 which is in a plane generally parallel to the plane of the deck. The sidewall 16, 18 extend to one side of and generally perpendicular to the plane of the deck structure so that the open top of the U-channel lies essentially in the plane of the deck.

The channel means has a channel portion 14a at the relative wide end of the device which is arcuate in configuration to provide the return arc portion or loop for the cable being stored. In the preferred and illustrated embodiment the arc portion of the channel portion 14a extends beyond 180° to communicate smoothly and tangentially at it opposites ends with straight side channel portions 14b and 14c lying along the opposite of the sides of the device and converging toward the relatively narrow entering and exiting end of the device.

The inner sidewall portion 16a at the arcuate end of the device lies along an arc portion of an appropriate diameter to provide a bending surface for limiting the bending of the optic fiber cable to a return arc portion of appropriate radius. The requirements of the arc portion are well understood by those in the field of the fiber optic cable handling.

The channel portions 14b, 14c are duplicates of each other and converge toward the relatively narrow entering and exiting end of the deck so that the entering and exiting portions of the cable are in proximate positions along side each other.

In the preferred embodiment, the outer side wall of the channel portions 14b, 14c, terminate short of the narrow end of the device whereby the bottom of the channel provides a narrow shelf 22 extending around the narrow end. The inner sidewall also extends around the narrow end and is rounded to form a smooth nose portion 24 rising from the shelf 22 to the deck structure to provide a smooth separation guide portion for the entering and leaving portions of the cable in the channel 14.

The deck is formed as a skeletal deck, which is symmetrical about a longitudinal centerline. It has openings which define the skeletal nature of the deck which comprises a centerline portion 28 extending from the nose 24 of the device to approximately the center for the radius of the return arc portion at the wide end of the device and which terminates at a cross portion 30. The centerline portion is basically defined by the openings 32 and 34, one on either side of the centerline portion with the cross portion being defined by the top boundaries of the openings 32 and 34, as viewed in FIG. 1, on one side, and triangular openings 36, 37 and 38 having top (as viewed in FIG. 1) arcuate boundaries along the channel portion 14a with their apexes along the cross portion. The openings 36 and 37 and the openings 37 and 38 are respectively separated by deck portions 40 and 41 which extend to the inner wall of the channel 14 from the cross portion generally along radii of the arcuate channel portion 14a to define arcs along the channel portion 14a of approximately 60° for the openings 36,37, 38. The center of the cross portion contains the center for the radius of the arcuate channel portion 14a and lies along a diameter of the return arc which subtends the arcuate portion 14a. At its opposite ends, the cross-deck portion joins the top of the inner walls 16 and integrally molded, in the preferred embodiment, with the top of inner wall 16. Openings are also preferably provided on either side of the centerline portion adjacent the nose as illustrated in FIG. 1.

The orientation of the bottom of the channel in accordance with the present invention makes it relatively easy to provide openings for tying the cable in the storage channel as well as to minimize wind sway. The bottom of the channel is provided with numerous openings 50 distributed throughout the length of the bottom of the channel means. These openings, apart from tying, will also help in minimizing wind sway by providing numerous regularly spaced openings through the bottom of the channel means for the passage of air, in effect, "a swiss cheese" bottom. Preferably as illustrated in the drawings, the openings have a width less than, or about, one-half of the width if the bottom 19 and alternate between being adjacent the inner and outer sidewalls. This provides a structural continuity for the bottom and enables numerous openings and facilitates the tying of the cable.

In use, the aerial cable storage device may be suspended in a conventional manner from a support strand for supporting the optical cable by using conventional hangars which are fastened to the support strand. These hangars have flat metal bottoms which are bolted to the top side of the storage device. In the preferred embodiment, there are five bolt openings designated 54, 54a, 54b, 54c, and 54d spaced along the cross portion of the deck for use in bolting hangars to the top of the deck as viewed in FIG. 1. The center bolt hole 54 is on the centerline of the device and at the radius center of the return arc portion for the channel 14a. A bolt hole 55 is located on the centerline portion 28 on the centerline of the device near but spaced inwardly of the nose end of the deck for accommodating the conventional second hangar. When suspending the device, two hangars are used, one at the arcuate end of the device which is bolted to the device through one of the bolt holes 54 or 54a-54d, and one at the nose end which is bolted to the device through the bolt hole 55. Most commonly bolt holes 54 and 55 are used.

Each of the bolt holes 54, 54a-54d and 55 is flanked by a respective set of parallel ribs 56, 57, one on each side thereof, with the respective hole being longitudinally and cross-wise centered along its corresponding ribs. The respective set of ribs for the bolt holes 54 and 55 on the centerline of the device are perpendicular to the centerline of the device while the ribs for the bolt holes 54a, 54b, 54c and 54d are perpendicular to a line through the center of the corresponding bolt hole and the center of the bolt hole 55. Thus, the sets of ribs for the bolt holes in the cross portion are angularly oriented relative to each other with the centers of their respective bolt holes lying along an arc having its center at the center of bolt hole 55.

Figure 5:
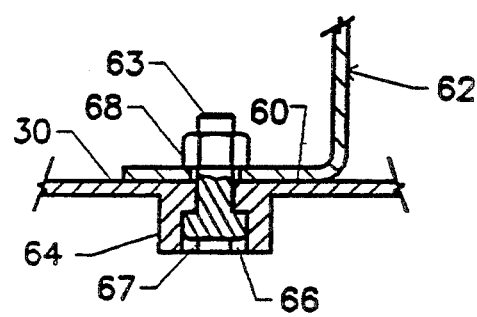
FIG. 5 is a sectional view corresponding to FIG. 2 but modified to illustrate, in part, a conventional suspension hangar connected to the deck of device.

For suspending the device, the ribs of each bolt hole are spaced to receive the bottom 60 of a hangar 62, see FIG. 5, and to hold it against rotation relative to the deck. The bottom of the hangar has a bolt hole for receiving a bolt 63 extending through the hole in the hangar and the deck hole aligned therewith to bolt the hangar to the top of the deck.

Figure 2:
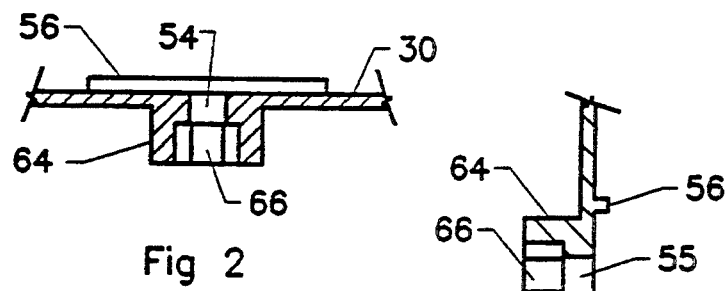
FIG. 2 is a fragmentary sectional view along line 2—2 of FIG. 1.

Each of the bolt holes in the deck has a boss 64, integral with and depending from the underside of the deck, See FIGS. 2 and 5. Each boss has an opening 66 for receiving the head 67 of the bolt 63. The openings 66 are shaped to provide a hand press fit with the bolt head to hold the bolt in the hole and against turning. As shown, the openings 66 are hexagonal for closely receiving hexagonal bolt heads. The bottom of the boss has a smaller opening which is an extension of and centered with the corresponding bolt hole opening in the deck so that when inserted the bolt extends through the aligned hole in the deck and the aligned hangar hole to receive the nut for securing the hangar to the deck.

In use as an aerial storage device, the device is usually suspended with two hangars by bolts cooperating with two of the bolt holes, one hangar being bolted to the device through bolt hole 55 and the other being bolted to the deck through one of the bolt holes 54, 54a-54d. These latter bolt holes provide flexibility for the bolted connections to accommodate various conditions met in the field, e.g., allowing the storage device to be suspended from a support strand with more or less of the wide end of the device extending to one side or the other of the support strand.

The design of the storage device described also allows storage devices to be readily stacked one on another using long bolts through aligned bolt holes in the stacked units. It will be appreciated that while the bolt hole 55 and another bolt hole on the cross portion may have long bolts for connecting the stacked the units as well as suspending the stacked units from a strand. A multi-unit storage of two or more units may be tied together solely by long bolts extending though other bolt holes not used for suspending the stacked units. In the case of a two unit aerial storage device, the bottom unit may be connected to the top unit by using the bolt holes 54a and 54d in the top and bottom units to bolt the units together with the center holes 54 and 55 being used with a long bolt through all units or only bolts in the top unit for purposes of connecting to the hangars. The five bolt holes in the cross portion makes it possible to use a long bolt in the cross portion through all units for suspension purposes and to bolt three or more units together with other bolts which extend only through two units. For example, the first two units can be connected using the bolt holes 54a, 54d with the second and third units connected to each other using the bolt holes 54b, 54c. It will be understood that when bolts are used to only connect units together, the hangar bottom is not present and the nut is used directly against the deck, preferably with a washer.

It can be appreciated that the illustrated storage device may be mounted otherwise than from a strand for use in storing an extra length of cable, for example, on poles, or the like, with the plane of the loop in a generally vertical direction.

It can now be seen that the present invention provides a flexible aerial storage device for storing fiber optic cable with the loop having a relative wide arcuate end to provide a turn-around arc portion for the cable and sides converging from the arc portion of the loop to the end of the device opposite the arc. The storage device has channel means which receives the cable which is stored in the loop with the channel means having inner and outer opposing walls perpendicular to the plane of the loop. The inner and outer walls are joined by a bottom which is opposite an open channel open top for receiving the cable into storage between the opposing walls. A mounting and supporting skeletal deck inwardly of the channel loop joins with the inner wall of the channel means as an integrally formed part thereof.

It can readily be seen by those familiar with installing fiber optic storage devices of the type here involved that the cable to be stored can be led into one side of the storage device, for example, channel portion 14b, by laying it on the shelf 22 and the bottom of the channel to start the looping process. As the cable looping approaches the arc, the cable moved downwardly into the channel will trap it from springing outwardly as the cable approaches the return arc. As the looping continues into and through the arc, the cable is simultaneously bent with the aid of the inner wall of channel portion 14a and moved downwardly into the channel to trap it in the channel as one proceeds along the arc, much like one would do in laying a stiff hose or wire into a curved channel. If desired, the cable may, in difficult cases, be readily tied to the bottom to aid in bending it around the arc. However, it is contemplated that the outer sidewall will facilitate the trapping of the cable in the channel sufficiently to enable bending into the channel without the necessity of using ties.

Figure 3:
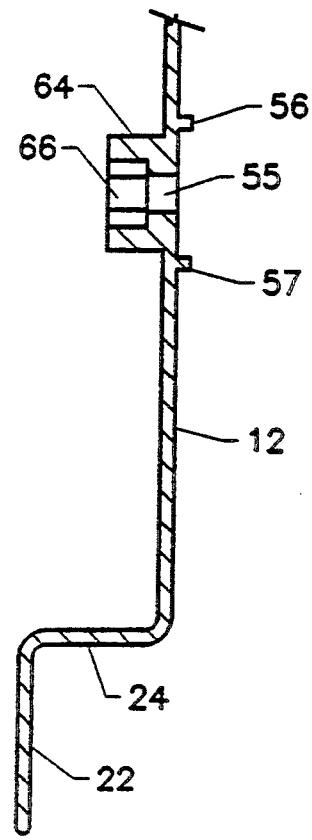
FIG. 3 is a fragmentary sectional view along line 3—3 of FIG. 1.
Figure 4:
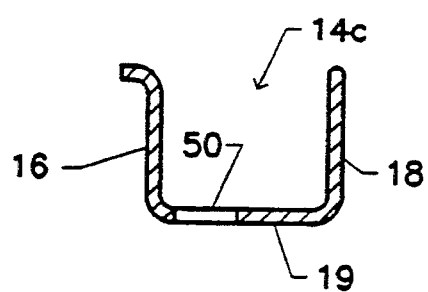
FIG. 4 is a fragmentary sectional view along line 4—4 of FIG. 1

While the illustrated channel of the preferred embodiment is of essentially uniform configuration throughout the extent of outer wall 18, i.e. that shown in FIGS. 1, 3, and 4, it will be understood that the broadest scope of the invention contemplates that the channel may have interruptions when such does not provide edges against which the cable may work to its detriment and the structural integrity of the aerial storage device is maintained.

What I claim is:

1. An aerial cable storage device for supporting and storing a generally planar loop of fiber optic cable in a fiber optic transmission line for transmission of data signals, said device comprising opposite first and second ends, and channel means about the outer periphery of said device providing an essentially planar storage loop, said channel means having opposing inner and outer side walls and an open top for receiving cable between the side walls, and comprising an arcuate channel portion having opposing arcuate inner and outer side walls extending about the first end of the device to provide a return arc portion for stored cable and side channel means on opposite sides of the device each comprising channel portions having opposed inner and outer side sidewalls, said side channel means converging from the ends of the return arc portion toward the second end for storing the cable between the return arc portion and said second end, said side walls of said channel portions extending generally perpendicularly to the plane of the loop with the inner side wall of said arcuate channel portion providing a surface for forming a return loop in the cable being stored, said storage device having a skeletal, essentially planar, support and mounting deck disposed inside the loop of said channel means to extend perpendicularly to said channel means and integrally joined to said inner wall of said channel portions, said deck having means for mounting the deck on a support for said device.

2. An aerial cable storage device as defined in claim 1 wherein said channel portions are U-shaped in cross section with the said opposed walls being joined by a bottom wall.

3. An aerial cable storage device as defined in claim 2 wherein said channel means comprises a channel having opposite channel ends on opposite sides of said device in proximity to and inwardly of said second end of said device.

4. An aerial cable storage device as defined in claim 3 wherein said bottom wall of said channel means extends about the outer periphery of said second end of said device between the said opposite ends of said channel to form a shelf for cable portions entering and exiting said device.

5. An aerial cable storage device as defined in claim 4 in which said inner wall extends about said second end of said device to provide a rounded nose separating the entering and leaving portions of the cable at said second end.

6. An aerial cable storage device for supporting and storing a generally planar loop of fiber optic cable of a fiber optic transmission line for transmitting data signals, said device having a periphery comprising opposite sides extending lengthwise of the loop between first and second opposite ends and channel means on the outer periphery of said device providing an essentially planar storage loop for storing a length of cable, said channel means having an open side to receive the cable to be stored and bottom wall means opposite said open side, said channel means comprising an arcuate channel portion extending around said first end of said device to define a return arc for cable stored on the device and side channel portions on said opposite sides of said device for guiding said cable length to and from said return arc, said arcuate channel portion having opposing inner and outer arcuate side walls, said side channel portions each having opposing inner and outer side walls and said side channel portions on said opposite sides converging from the return arc toward said second end, said opposing side walls of said channel portions extending inwardly of the open side of said channel means and generally perpendicularly to the plane of the loop and the inner side wall of said arcuate channel portion providing a bending surface for forming a return loop in the cable being stored.

7. An aerial cable storage device as defined in claim 6 wherein said channel means is U-shaped in cross section with the said opposed walls of said channel portions being joined by said bottom wall means.

8. An aerial cable storage device as defined in claim 7 wherein said channel means is essentially a continuous channel having opposite channel ends on opposite sides of said device in proximity to and inwardly of said second end of said device.

9. An aerial cable storage device as defined in claim 7 wherein said channel means has channel ends on opposite sides of said device in proximity to and inwardly of said second end of said device.

10. An aerial cable storage device as defined in claim 9 wherein said bottom wall means extends about the outer periphery of said second end of said device between said opposite ends of said channel means to form a shelf for the stored cable portions entering and exiting said device.

11. An aerial cable storage device as defined in claim 10 in which the inner walls of said side channel portions extend about said second end of said device to provide a rounded nose separating entering and exiting cable portions at said second end.

12. A cable storage unit for a transmission line for storing an extra length of a cable in the form of a planar loop having opposite first and second ends, said loop having a longitudinal centerline and said first end of said loop having an arcuate configuration to return the cable to the said second end of the loop, said storage unit comprising:

a generally planar mounting and supporting deck structure having opposite first and second end portions adjacent said first and second ends respectively, a centerline, and opposite longitudinal sides converging from said first end portion toward said second end of said deck structure with the periphery of the deck structure defining said loop, said first end portion of said deck structure having an arcuate periphery which is centered on the centerline of the deck structure for defining the arcuate return portion of said loop, and said second end portion comprising the cable entrance and exit end of the loop, and channel means mounted on the outer periphery of said deck structure for receiving and storing the cable in said loop, said channel means comprising opposed inner and outer side walls, and bottom wall means joining the inner and outer side walls to provide a generally U-shaped channel means having an open side for receiving the cable to be stored in a loop, said deck structure being joined at its outer periphery to the inner of said inner and outer side walls, said inner and outer side walls each being perpendicular to the plane of said planar deck structure and said bottom wall means being generally parallel to the planar deck structure.

13. A cable storage unit for storing an extra length of cable of a transmission line as defined in claim 12 wherein said unit is of an electrically non-conductive plastic.

14. In a cable storage unit for storing an extra length of cable as defined in claim 12 wherein said unit is a one piece integrally molded unit.

15. In a cable storage unit for storing an extra length of cable of a transmission line as defined in claim 14 wherein said deck structure comprises a skeletal structure having openings therethrough for passage of wind.

16. A cable storage unit for storing an extra length of cable of a transmission line as defined in claim 12 wherein said unit is an integrally formed one piece unit and said deck structure joins the inner of said inner and outer sidewalls adjacent said open side of said channel means.

17. A cable storage unit as defined in claim 12 and wherein said deck structure comprises a longitudinal centerline portion adjacent said second end of said unit comprising a first connecting means on the centerline of the deck for connecting a first deck support means, and a cross portion extending between portions of said inner walls on opposite sides of said unit, said cross portion extending generally perpendicular to the centerline of said unit and subtending said arcuate end of said unit and comprising spaced second connecting means distributed therealong for selective use in connecting a second support to said storage unit, said second connecting means comprising a center connecting means centered on said deck structure and additional connecting means comprising one on either side of said center connecting means, each of said second connecting means having parallel guide portions on opposite sides thereof for receiving a supporting plate member of a second support, said guide portions for each connecting means being oriented perpendicularly to a line from the respective second connecting means to said first connecting means.

18. A cable storage device as defined in claim 12 wherein said channel means has opposite channel ends on opposite sides of said device in proximity to and inwardly of said first end of said device, said bottom wall means extending about the outer periphery of said second end of said device between the said opposite ends of said channel to form a shelf for the cable portions entering and leaving said device and said inner of said inner and outer walls extending about said second end of said device to provide a rounded nose separating entering and leaving cable portions at said second end.

19. A cable storage device as defined in claim 18 wherein said bottom wall means has openings distributed therealong for selective use in tieing cable to said channel means.

20. A cable storage unit for storing an extra length of cable of a transmission line as defined in claim 18 wherein said unit is an integrally formed one piece unit and said deck structure joins the inner of said inner and outer sidewalls adjacent said open side of said channel means.

21. A cable storage unit as defined in claim 18 wherein said unit is an integrally formed one piece unit and said deck structure joins the inner of said inner and outer sidewalls adjacent said open side of said channel means, said deck structure having openings therethrough to provide a skeletal structure having a cross portion extending between portions of said inner sidewalls on opposite sides of said unit, said cross portion extending perpendicular to the centerline of said unit and subtending said arcuate end of said unit, a plurality of openings extending through said cross portion and distributed along said cross portion for selective connection of a support element for said storage unit and an additional opening on the centerline of said deck structure in proximity to said first end for connecting a support element for said storage unit.

22. A cable storage connecting unit as defined in claim 20 wherein the respective ones of said second connecting means are located at a common distance from said first connecting means.

* * * * *